UNITED STATES PATENT OFFICE.

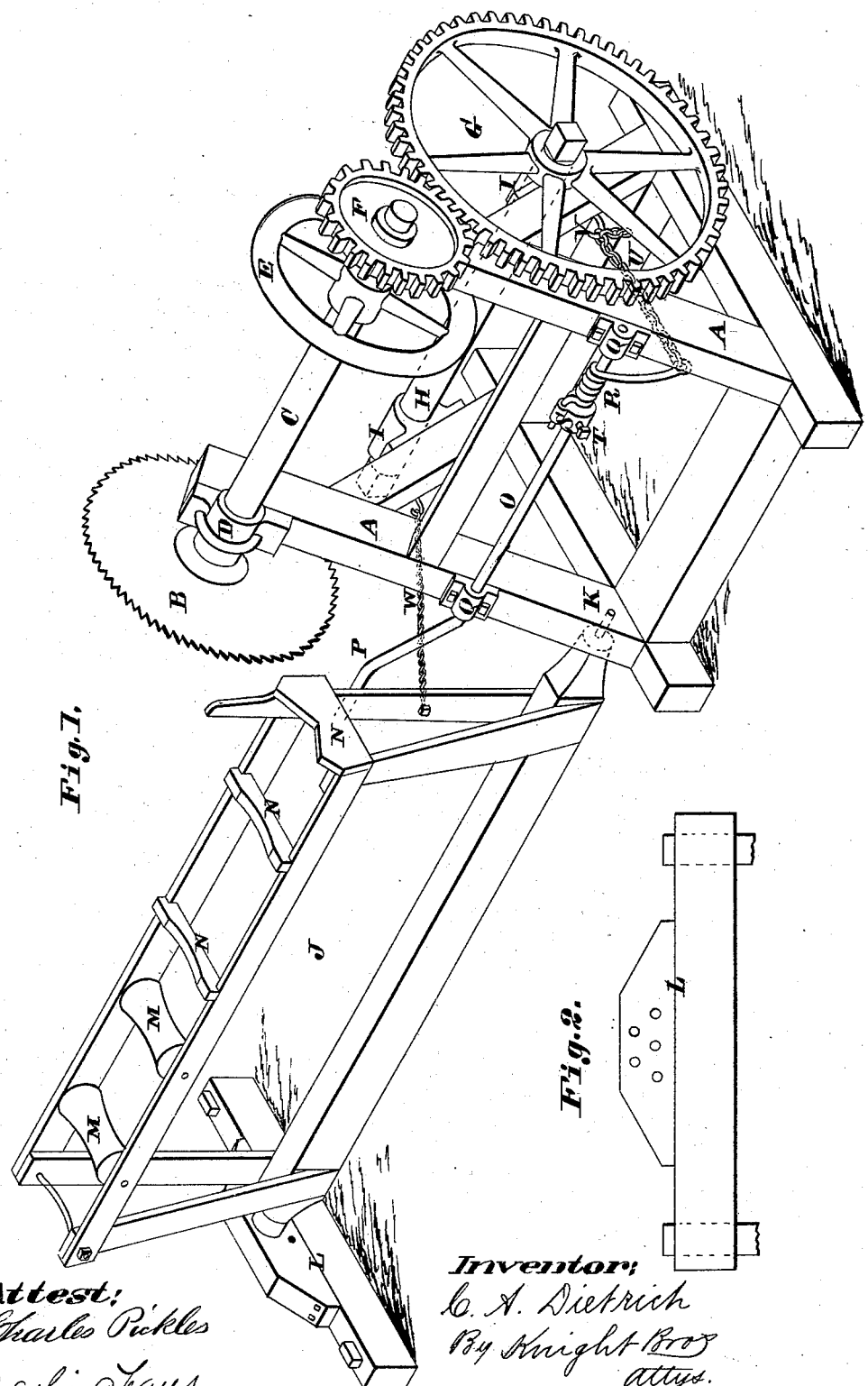

CARL A. DIETRICH, OF SHAWNEETOWN, MISSOURI.

SAWING-MACHINE.

SPECIFICATION forming part of Letters Patent No. 280,144, dated June 26, 1883.

Application filed October 3, 1882. (No model.)

*To all whom it may concern:*

Be it known that I, CARL A. DIETRICH, of Shawneetown, in the county of Cape Girardeau and State of Missouri, have invented a certain new and useful Improvement in Sawing-Machines, of which the following is a full, clear, and exact description, reference being had to the accompanying drawings, forming part of this specification, and in which—
Figure 1 is a perspective view of a sawing-machine embodying my improvement. Fig. 2 is a side elevation of the support for one end of the oscillating pole or log rack.

My invention relates to certain improvements on a machine for sawing poles and small logs of wood into stove-wood, &c.; and it consists, principally, in the device for throwing the pole-rack forward after a length has been cut off, fully described and claimed hereinafter.
Referring to the drawings, A represents a suitably-constructed frame; B, the saw; C, the saw-mandrel, journaled in suitable boxes, D, secured to the frame A; E, a fly-wheel on the mandrel C; F, a spur-wheel on the outer end of the saw-mandrel; G, a cog-wheel engaging with the wheel F, and secured to one end of a driving-shaft, H, journaled in suitable boxes, I, secured to the frame, as shown; and J, the log or pole carrying rack, pivoted by means of a pin, K, by one end to that end of the frame A at which the saw is located, its other end being supported in like manner by means of a block, L, of wood, staked to the ground. By thus supporting the rack it will be seen that it can be freely oscillated or rocked to or from the saw. The pole or log to be cut up rests upon the rollers M and cross-pieces N, and when moved endwise the necessary distance the rack is rocked toward the saw until the saw has cut the pole in two, and then the rack is thrown back to its forward position— the position in which it is shown—by means of a rock-shaft, O, with a crank, P, that engages behind the rack, journaled in suitable boxes, Q, secured to the frame, as shown. The shaft is rocked to its normal position—the position shown—by a spring, R, surrounding the shaft, and secured thereto by one end by means of a collar, S, held to the shaft by a set-screw, T, its other end extending downward and connected to the frame A by means of a chain, U, and hook V. By tightening on the chain the tension of the spring can be increased, so that any power necessary for moving the rack forward may be given to the rock-shaft. The rack is moved toward the saw by a person standing on either side of it, and its forward movement is limited by means of a chain, W, secured thereto by one end and by the other end to the frame A. Suitable power can be applied to either end of the driving-shaft H. As the rack is held forward by the rock-shaft and prevented from moving farther forward by the chain W, it will be seen that it will be held stationary while the log or pole is being moved endwise for another cut.

I do not claim, broadly, an oscillating log or pole carrying rack for sawing-machines; but

I claim as my invention—

In a sawing-machine, the combination of frame A, saw B, mandrel C, fly-wheel E, spur-wheel F, cog-wheel G, shaft H, said mandrel and shaft being secured to the frame A by suitable boxes, pole-rack J, supported at one end by the frame A and at the other end by a block, L, chain W, connecting the rack to the frame, and rock-shaft O, with crank P and spring, the spring being connected to the shaft by a collar, S, and to the frame A by a chain, U, all as set forth.

CARL A. DIETRICH.

Witnesses:
SAML. KNIGHT,
GEO. H. KNIGHT.